US 6,572,122 B2

(12) United States Patent
Johnson et al.

(10) Patent No.: US 6,572,122 B2
(45) Date of Patent: *Jun. 3, 2003

(54) MULTIPLE CHILD SEAT NESTABLE SHOPPING CART

(75) Inventors: Christopher M. Johnson, Richmond, VA (US); Ralph McCann, Richmond, VA (US)

(73) Assignee: Rehrig International, Inc., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/848,436

(22) Filed: May 4, 2001

(65) Prior Publication Data

US 2002/0020977 A1 Feb. 21, 2002

Related U.S. Application Data

(63) Continuation-in-part of application No. 09/239,817, filed on Jan. 29, 1999, now Pat. No. 6,270,093.

(51) Int. Cl.[7] .............................. B60N 2/26; B62B 3/14
(52) U.S. Cl. .................... 280/33.993; 280/47.4
(58) Field of Search .................. 280/33.991, 33.992, 280/33.993, 33.997, 47.38, 47.35, 47.4, 204, 79.2, DIG. 4; 297/256.17, 248; 224/411; D34/21, 27

(56) References Cited

U.S. PATENT DOCUMENTS

| 2,420,088 A | 5/1947 | Milburn |
| 2,508,670 A | 5/1950 | Goldman |
| 2,997,311 A | 8/1961 | Unamoff |
| 3,044,801 A | 7/1962 | Vicany |
| 3,497,234 A | 2/1970 | Schray |
| 3,498,633 A | 3/1970 | Hopkins |
| 3,575,250 A | 4/1971 | Dykes |
| 3,834,726 A | 9/1974 | Hobza |
| 3,953,046 A | 4/1976 | Johansson |
| 4,116,456 A | 9/1978 | Stover et al. |
| 4,305,601 A | * 12/1981 | Berge ............ 280/304.1 |
| 4,484,755 A | * 11/1984 | Houston ............ 280/304.1 |
| D281,365 S | 11/1985 | Gugler |
| 4,610,454 A | 9/1986 | Gill |
| 4,650,199 A | 3/1987 | Rehrig |
| 4,706,975 A | 11/1987 | Arena et al. |
| 4,771,840 A | 9/1988 | Keller |
| 4,834,404 A | 5/1989 | Wood |
| 5,011,169 A | 4/1991 | Henderson et al. |
| D318,550 S | 7/1991 | Stefano |
| 5,076,599 A | 12/1991 | Lockett et al. |
| 5,149,114 A | 9/1992 | Lewandowski et al. |
| D330,103 S | 10/1992 | Andrews, Jr. et al. |
| 5,176,395 A | 1/1993 | Garforth-Bles |
| 5,188,389 A | 2/1993 | Beechler et al. |
| 5,203,578 A | 4/1993 | Davidson et al. |

(List continued on next page.)

FOREIGN PATENT DOCUMENTS

| DE | 42 02 428 A1 | 6/1992 |
| DE | 42 19 121 A1 | 12/1993 |
| DE | 43 17 228 A1 | 12/1993 |

OTHER PUBLICATIONS

*Shopper's Aid*, Undated Brochure of MART CART advertising dual seat shopping cart. (2 pages).

*Primary Examiner*—Paul N. Dickson
*Assistant Examiner*—David R. Dunn
(74) *Attorney, Agent, or Firm*—McGuireWoods LLP

(57) ABSTRACT

A multiple child seat nestable shopping cart is provided with a wheeled chassis and a seating module. The seating module includes front and rear wheels and at least two seats facing inwardly towards each other and positioned behind a rear portion of the shopping cart basket. The seats are positioned, dimensioned and configured so as to receive a front nesting portion of another cart basket over the at least two seats when unoccupied.

21 Claims, 5 Drawing Sheets

U.S. PATENT DOCUMENTS

| | | |
|---|---|---|
| 5,263,726 A | 11/1993 | Wood |
| 5,312,122 A | 5/1994 | Doty |
| 5,330,210 A | 7/1994 | Lambrecht |
| D357,105 S | 4/1995 | Reiland et al. |
| 5,429,290 A | 7/1995 | Greene, Jr. |
| 5,553,876 A | 9/1996 | Trubiano |
| 5,641,200 A | 6/1997 | Howell |
| D386,873 S | 11/1997 | Langlois D'Estainot et al. |
| 5,702,114 A | 12/1997 | Downing et al. |
| 5,823,548 A | 10/1998 | Reiland et al. |
| 5,848,797 A | 12/1998 | Paez |
| 6,327,924 B2 * | 5/2001 | Reiland et al. ........ 280/33.993 |
| 6,270,093 B1 * | 8/2001 | Johnson et al. ........ 280/33.993 |

* cited by examiner

MULTIPLE CHILD SEAT NESTABLE SHOPPING CART

CROSS REFERENCE

The present invention is a Continuation-in-Part application of U.S. application Ser. No. 09/239,817, filed on Jan. 29, 1999, (now U.S. Pat. No. 6,270,093) and assigned to common assignee herewith. The present application claims the benefit of priority to U.S. patent application Ser. No. 09/239,817.

BACKGROUND OF THE INVENTION

1. Field of the Invention

The present invention generally relates to nestable shopping carts and, more particularly, to a nestable shopping cart having a multiple carrier child seat.

2. Background Description

Shopping carts are widely used in supermarkets, department stores, airports and the like. A useful feature of shopping carts is the ability to be nested with other shopping carts. This nesting feature allows the shopping carts to be compactly stored in a single row at a predetermined location of the supermarket or other store without the need for additional space which could otherwise be used for other more effective purposes. The nesting of the shopping carts also allows for easy access to the carts by customers on a self-service basis.

To provide nesting for several carts, the shopping cart should have a rear panel that pivots upward upon being engaged by the front portion of a similar basket of another cart. The basket in the second cart can then be fitted inside, or nested, within a rear portion of the basket of the first cart so that numerous carts can be neatly and compactly arranged facing front-to-back in a single row. One such cart is disclosed in U.S. Pat. No. 5,458,347 to Chiv which is hereby incorporated by reference in its entirety. However, a variety of other cart designs, including luggage carts, may also be nestable.

In conventional nestable carts, a foldable child seat is often added to the rear panel of the basket. In one common arrangement for such a foldable seat, the back support panel of the seat is pivotally attached to the chassis near the bottom of the rear basket panel. A fold down seat panel then traverses the back support panel and the rear basket panel to form a child seat inside the basket near the upper portion of the rear basket panel. Generally, the child seat is arranged so that the child's torso is inside the basket while the child's legs extend through openings in the back panel. Such child seats generally have room for only one child, are confining and uncomfortable and often result in restless behavior.

The above described foldable child seats may also have a higher center of gravity. Specifically, a heavy child seated in the foldable seat of a lighter weight cart may significantly raise the center of gravity of the cart, especially when the rest of the basket is empty or the child attempts to stand up within the cart. To overcome this problem, U.S. Pat. No. 3,044,801 to Vicany discloses a cart with a single, lower, front-facing seat extending across the rear width of the cart for providing a lower center of gravity. However, such carts have to be extremely wide in order to accommodate larger children and the seat portion of these carts often takes up a significant amount of space in the basket. In addition, seating areas do not provide any protection for some portions of the child's body.

Another example of a child seat is shown in U.S. Pat. No. 5,702,114 to Downing et al. Downing et al. show a shopping cart having two child seats, arranged side-by-side, facing backwards in the basket portion of the cart. However, much like the Vicany cart, the Downing et al. cart has to be extremely wide in order to accommodate larger children and the seat portion of these carts often takes up a significant amount of space in the basket.

As still another example, U.S. Pat. No. 5,312,122 to Doty discloses a shopping cart attachment which allows two children to ride backwards, facing front to back, within the shopping cart. In this type of cart, only one child takes up space inside the basket, itself. Although the Doty cart addresses the problem of excessive cart width, it creates a new problem where the child in the rear seat can be easily taunted by the other child. This arrangement also does not allow both children to face forward during the movement of the cart.

Another multiple child seat cart is shown in U.S. Pat. No. 5,823,548 to Reiland et al. In Reiland et al. a multiple child carrier accessory which attaches to an existing shopping cart using a large and cumbersome mounting bracket is shown. The device includes a carrier body with left and right forward-facing seat areas and a center divider which generally prevents the riders from interacting with each other when seated within the cart. The child carrier accessory is not easily maneuverable when not attached to a conventional shopping cart. Also, although children in this carrier are somewhat protected by the side support portions formed in each seat, their legs and feet are still not protected. Moreover, the seats in the carrier accessory are arranged at approximately the same height as the foldable seat in the basket and thus may raise the center of gravity for the carrier and cart when occupied by children.

It is also noted that carts with multiple child seats do not allow for the nesting relationship between adjacent carts. For example, while an auxiliary unit located behind the main shopping cart basket might present a practical approach to providing multiple child seats for a shopping cart, such an auxiliary unit does not enable some form of nesting between similar shopping carts to minimize storage space required for idle carts. This can pose a problem from both a storage and access standpoint.

SUMMARY OF THE INVENTION

In one aspect of the present invention, a multiple child seat nestable shopping cart is provided with a wheeled chassis having a longitudinally extending central area. A shopping cart basket is mounted on the wheeled chassis and includes a front nesting portion. A seating module is connected to the wheeled chassis and has at least one seat facing inwardly and positioned behind a rear portion of the shopping cart basket. The seats are positioned, dimensioned and configured so as to receive a front nesting portion of another cart basket over the at least two seats when unoccupied. The seating module also has at least one front wheel and at least one rear wheel. The at least one seat may be at least two seats which face each other.

In another aspect of the present invention, a nestable shopping cart and child seat has a basket module including a forwardly projecting basket having a front nestable portion. A seat module having a front set of wheels and a rear set of wheels and a longitudinal central area is positioned in a rear of the wheeled basket module. The seat module includes at least a first child seat facing a second child seat, both facing towards the longitudinal central area. A rear area in the seating module receives another shopping cart over the first child seat and the second child seat.

In yet another aspect of the present invention, a multiple child seat nestable shopping cart having a wheeled shopping cart and a wheeled seating module with at least one front wheel and at least one rear wheel is provided. A first and second inwardly facing seat are spaced apart from one another and are both positioned within the wheeled seating module on opposite sides thereof. The first and second inwardly facing seats are dimensioned and configured so as to permit a forward overhanging portion of a basket of another shopping cart to pass over the seats for nesting. A floor extends between the first and second inwardly facing seats.

BRIEF DESCRIPTION OF THE DRAWINGS

The foregoing and other objects, aspects and advantages will be better understood from the following detailed description of the invention with reference to the drawings, in which.

DETAILED DESCRIPTION OF A PREFERRED EMBODIMENT OF THE INVENTION

Figure 1:
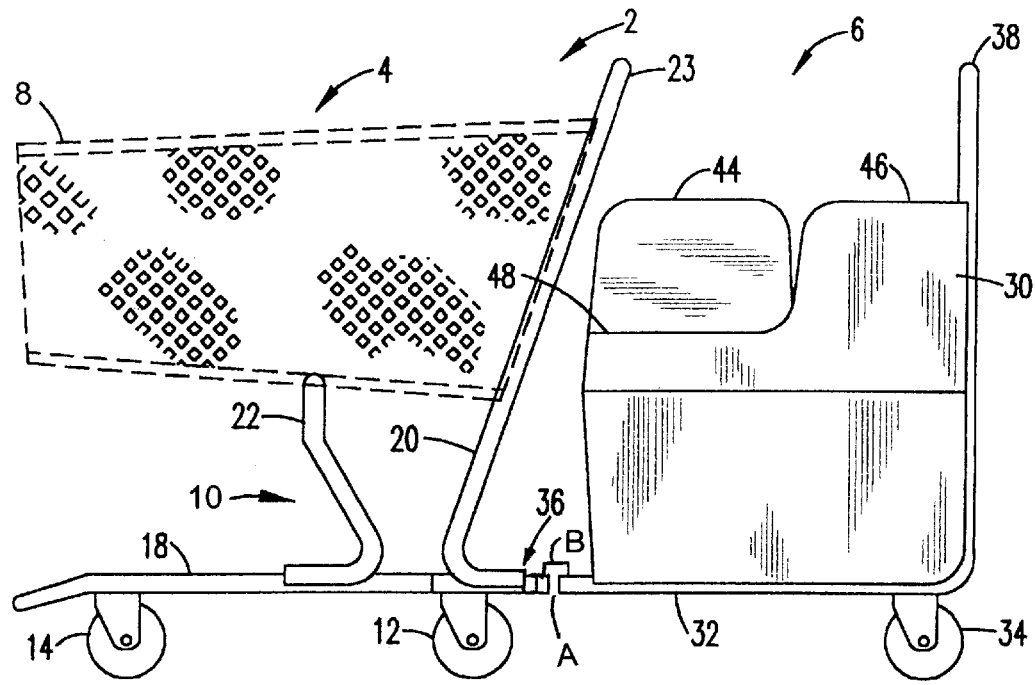
FIG. 1 is a side elevation view of one embodiment of a multiple child seat nestable shopping cart.
Figure 2:
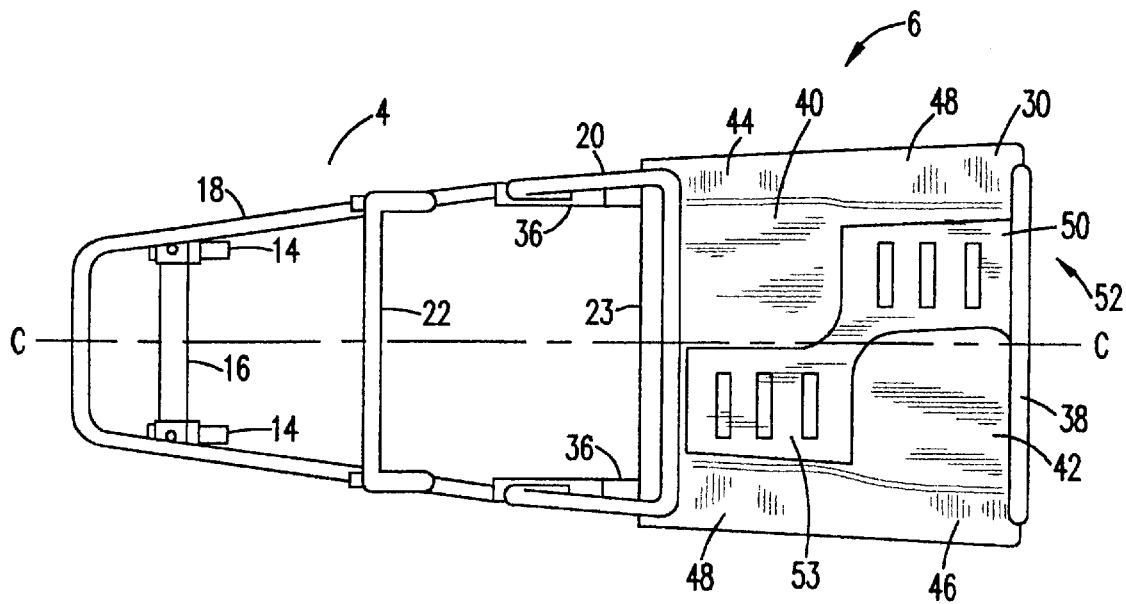
FIG. 2 is a top view of the cart of FIG. 1 with the cart basket and connecting bracket assembly omitted.
Figure 3:
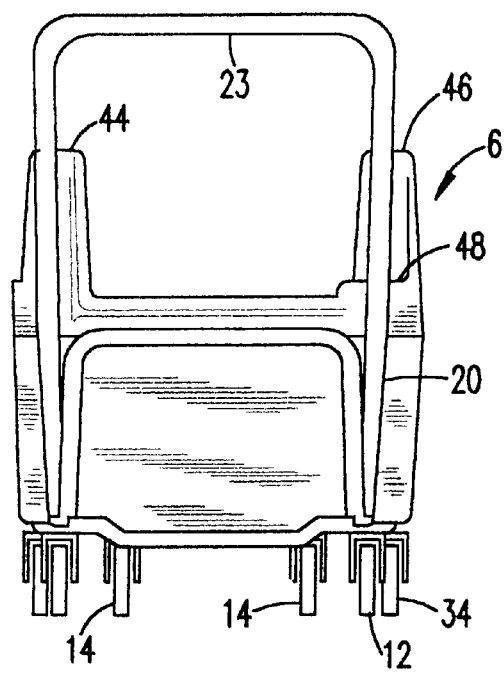
FIG. 3 is a front view of the cart of FIG. 1 with the basket and bracket assembly omitted.
Figure 4:
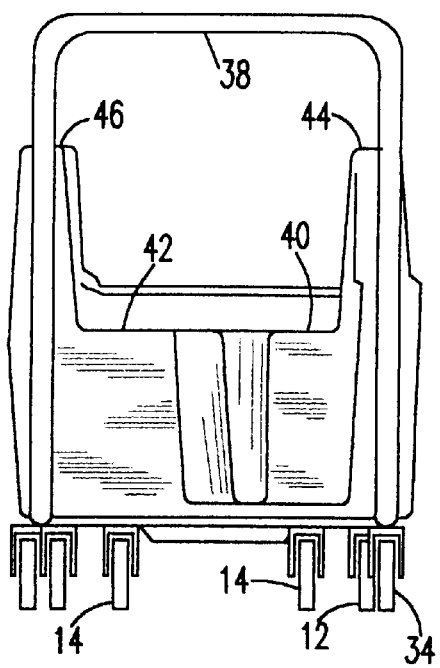
FIG. 4 is a rear view of the cart of FIG. 1 with the basket and bracket assembly omitted.

The present invention is directed to a nestable shopping cart which has a rear seating module. The seating module provides for at least the seating of two children therein. In the preferred embodiment, the rear seating module allows children to face one another; that is, the rear seating module has at least two spaced-apart inwardly-facing seats with backrests arranged on opposite sides of the module. The rear seating module also includes a floor and provides both adequate leg room and complete protection for the child seated therein. In the latter feature, the child's entire body will remain within the seating module while the child is seated therein. An opening is provided at the rear end of the seating module for providing at least two functions: (i) allowing ingress and egress from the seating module and (ii) allowing nesting of carts by partially receiving the front end of another basket (between two opposite side backrests and over seats) of the rear seating module of another cart.

Referring now to FIGS. 1–5, several views of one embodiment of a multiple child seat nestable shopping cart is shown. The shopping cart depicted in FIGS. 1–5 is but one shopping cart used with the rear child seating module of the present invention, and it is thus well understood that different types of carts may equally be used with the present invention. It is thus recognized that the shopping cart shown in FIGS. 1–5 is provided for illustrative purposes only and that the present invention should not be limited to this single embodiment. Accordingly, the size and shape of the cart as well as the materials discussed herein are provided for illustrative purposes only and that other sizes, shapes and materials may equally be used with the present invention without limitation.

Still referring to FIGS. 1–5, the cart is generally depicted as reference numeral 2 and includes a basket module 4 and a seating module 6. The basket module 4 generally includes a basket 8 (shown in dashed lines in FIG. 1) which is supported in an overhanging, forwardly projecting position by a basket module chassis 10. A set of front casters wheels 14 are rotatably mounted on a caster support member 16 which is secured to a bottom chassis member 18 of the basket module chassis 10. Although the front casters are shown on the right and left sides of the caster support member 16, a single caster may be used near the center of the caster support member 16 or near the center of the front portion of the bottom chassis member 18. The basket 8 is supported by a rear chassis member 20 and a center chassis member 22. The basket module 4 may be nested with another similar basket module 4 via a rear opening of the seating module 6 of the present invention. A handle portion 23 is arranged at the top of the rear chassis member 20.

The basket 8 is preferably made of a lightweight molded plastic material as disclosed in U.S. Pat. No. 3,999,774 to Rehrig, U.S. Pat. No. 4,650,199 to Rehrig, U.S. Pat. No. 4,865,338 to Rehrig and/or U.S. Pat. No. 4,946,059 to Rehrig, all of which are hereby incorporated by reference. The basket module 4 may also include a conventional foldable child seat (not shown) inside the basket 8 similar to those disclosed in U.S. Pat. Nos. 4,176,849 and 4,065,142 to Rehrig which are hereby incorporated by reference. The basket 8, and any child seat arranged inside the basket (not shown), may also be formed from metal or other suitable materials. The basket module chassis 10 is preferably formed from a tubular metal frame or a reinforced plastic structure such as disclosed in U.S. Pat. No. 4,746,134 to Rehrig which is hereby incorporated by reference.

Figure 5:
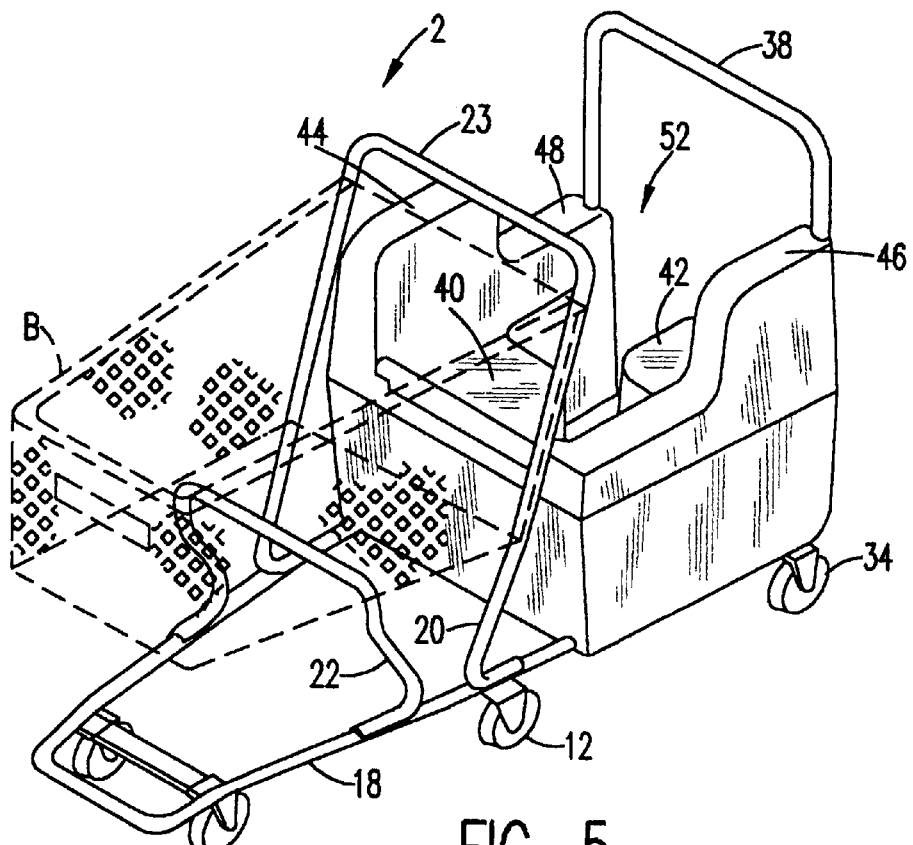
FIG. 5 is a front perspective view of the cart shown in FIG. 1 with the bracket assembly omitted.

Still referring to FIGS. 1–5, the seating module 6 is fixedly connected to the basket module chassis 10 preferably by a connector device or joint 36 (FIG. 1) or integrated rigidly and permanently with the chassis member 18 (FIG. 5). The connector 36 may be a female/male connection of the frame components of the seating module 6 and the basket chassis 10 with an aligning aperture "A" for a bolt "B" to pass therethrough. In an embodiment, the connector 36 is a rigid connection with very little space, if any, left between the basket module 4 and the seating module 6 in order to prevent children from climbing in or out over the front wall portion of the seating module 6. The chassis 32 of the seating module 6 may be integrally formed from reinforced molded plastic material as a single integrated unit with the seat body 30, if desired.

The seating module 6 includes a seat body 30 which is supported by the seating module chassis 32. A first set of rear wheels 34 rollingly support the seating module chassis 32 which is fixedly connected to the basket module chassis 10 preferably by the connector device or joint 36. A set of front wheels 12, which may be casters, also rollingly support the seating module chassis 32. However, a single front wheel support member similar to the caster support member 16 may also be used by the present invention. The seating module 6 is positioned and designed to allow nesting of carts.

The seating module chassis 32 may include a seat handle portion 38 which is preferably arranged higher than the highest portion of the basket 8 on the basket module 4 in order to allow another basket 8 of a similar cart 2 to fit under the handle 38 during a nesting operation. For example, the handle portion 38 on the seating module chassis 32 may be arranged at about the same level as the handle portion 38 on the rear chassis member 20. The handle portion 38 allows an operator to push and steer the cart 2 and may be hinged, or otherwise configured, for moving out of the way during nesting as shown in FIGS. 9–13.

The seat body 30 is preferably formed from a unitary molded plastic material with two seats 40 and 42 facing inwardly toward each other behind the basket module 4 on opposite sides of the centerline "C" (FIG. 2) of the cart 2. That is, the seats 40 and 42 face towards the central longitudinal axis or area (face toward the centerline in the lengthwise direction of the seating module 6) of the shopping cart 2. The seats 40 and 42 are generally arranged lower than the front overhang portion of the basket 8 in front of the chassis member 22 so that at least the front portion of a similar basket of another cart 2 may slide under the handle 38 and over the seats thereby allowing nesting of adjacent carts. For a second cart with a longer basket 8, a portion of the longer basket could nest inside the basket of the first cart 2.

The seats 40 and 42 may also be arranged substantially lower in order to accommodate carts with lower baskets or to maintain an even lower center of gravity for the cart 2 when larger children are sitting in the seats. Preferably, the seats 40 and 42 are lower than any foldable seat (not shown) that is arranged in the basket 8 so that the larger children sitting in the seats 40 and 42 will tend to compensate for changes in the center of gravity for the cart 2 when a child is also seated in any foldable seat inside the basket 8. The seat 40 is preferably close to the rear of the cart 2 than the seat 42. The seats 40 and 42 are also spaced apart from each other to allow for leg room, and are further positioned at such a height as to allow for a nesting operation. As further seen, the seats 40 and 42 preferably have edges which extends beyond one another, and may further be offset from one another as shown in FIG. 5 (for example). The cart 2 also includes a horizontal floor extending between opposite sides of the cart 2 in front of, and between, the two seats 40 ane 42.

Although the seats 40 and 42 may be any practical size, each seat 40 and 42 is preferably large enough to support a child in an upright seated position facing sideways relative to the cart 2 with the child's legs inside the cart. In this regard, each of the seats 40 and 42 is provided with a backrest 44 and a backrest 46, respectively, on opposite sides of the cart 2. The backrests 44 and 46 are preferably wide enough and high enough to protect a seated child's back, arms, shoulders, neck and head from a side collision, and, in particular, a side collision from another cart 2. The backrests 44, 46, the seats 40, 42 and the floor may be one integrally molded assembly.

The backrests 44 and 46 are also preferably wide enough apart on either side of the cart longitudinal axis, across the width of the cart 2, so as to be able to receive at least a front portion of a basket on a second similar cart 2 between the backrests 44 and 46. This allows for the nesting of two carts. Also, the width of the seating module 6 is preferably about the same width as the rear end of the basket module 4 for ease of maneuverability and storage. However, the seat body 30 may be designed for practically any width or length. The seats and backrests may also include padding and restraints for comfortably securing children into the seats.

The side walls of the seat body 30 are provided with recessed side portions (recesses) 48 next to the right and left backrests 44 and 46. These recesses 48 provide an unobstructed view for the child sitting in the seats 40 and 42 across from each recess 48. This unobstructed view helps to encourage children in the seating module 6 to stay seated while the cart 2 is in motion and yet still provides protection against side-impact collisions. The seats 40 and 42 and the respective backrests 44 and 46 may also extend along the entire length of the seating module 6 in order to create two side-by-side benches with room for four or more children. However, with such a two-bench arrangement, the width of the seating module 6 may need to be increased in order to provide adequate leg room for the children sitting directly across from each other.

Both the two-seat arrangement and the two-bench arrangement include backrests, or walls (not shown), which extend along the entire length of both sides of the seat body 30 and fully enclose both sides of the seating module 6 in order to provide additional side-impact protection to the user (children). However, such full-length backrests may be provided with openings, or windows, for allowing children to see outside the cart 2 without standing up within the seating module 6. The openings may also be decorative in appearance.

During normal use, a child may simply climb into the rear of the seat body 30 through a rear entrance 52 under or around the handle 38 and opposite of the rearward seat 42. The rear entrance 52 may also be used for easily sweeping out, wiping or hosing down the inside of the seating module 6 and is preferably provided with safety ribs 53 or other surface features to prevent slipping. Although the entrance 52 is general shielded by the body of the adult who is pushing the cart 2 with the handle 38, an additional gate (not shown), or other restraint, may be provided in the entryway 52. Similar passages and/or gates may also be provided on the sides of the seating module 6 at the recesses 48. Any such rear wall or gate in the body 30 may also extend as high as the backrests 44 and 46 and/or across the entire length of the seating module 6. A similar taller front wall may also be provided in the seating module 6.

Figure 6:
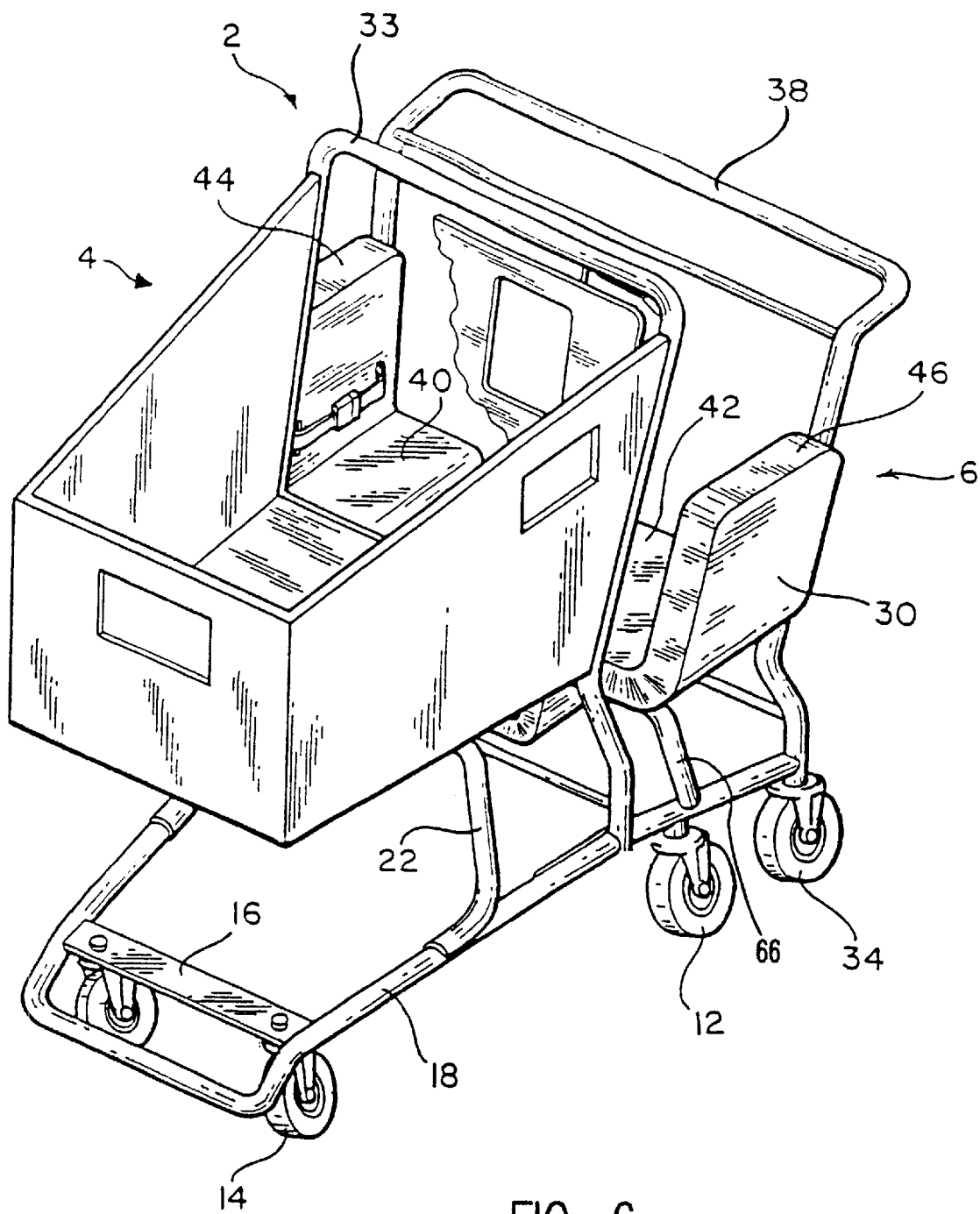
FIG. 6 is a perspective view of an alternative embodiment of a multiple child seat nestable shopping cart.

FIG. 6 is an isometric view of an alternative embodiment of a multiple child seat nestable shopping cart. In FIG. 6, the seats 40 and 42 are arranged directly across from each other in the seating module 6 and are supported by a seat chassis member 66.

FIGS. 7–13 show several handle arrangements for the seating module 6. The several handle arrangements of FIGS. 7–13 permit entrance and egress to and from the seats of the seating module 6. The handle arrangements also permit nesting of similar carts while maintaining cart maneuvering capabilities. It should be well understood by those of ordinary skill in the art that other handle arrangements are also contemplated for use with the present invention which would permit convenient entrance and exit to and from the seating area of the seating module while still leaving the central area of the seating module unencumbered for receiving the front portion of a similar cart for nesting purposes.

Figure 7:
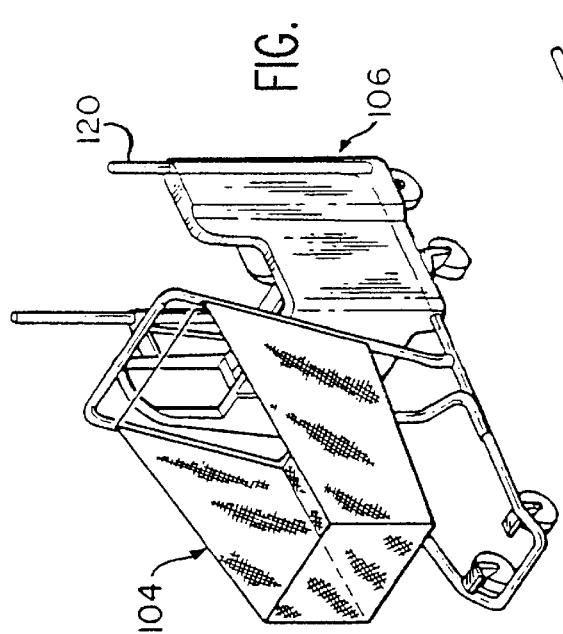
FIGS. 7–13 schematically illustrate several exemplary embodiments of handle arrangements.

In FIG. 7, a typical basket module 104 including a basket 108, chassis 110, wheels 112 and pushing handle 123 is connected to a seating module 106. The seating module 106 includes wheels 114 and maneuvering handles 116 that may comprise molded plastic surrounding metal or other rigid reinforcing posts 118 molded into the rear lateral sides of the seating module. The handles 116 provide individual grips for maneuvering the cart while leaving the rear of the seating module completely open to receive children in the seating areas or a nesting cart between the upright backrests of the seats.

Figure 9:
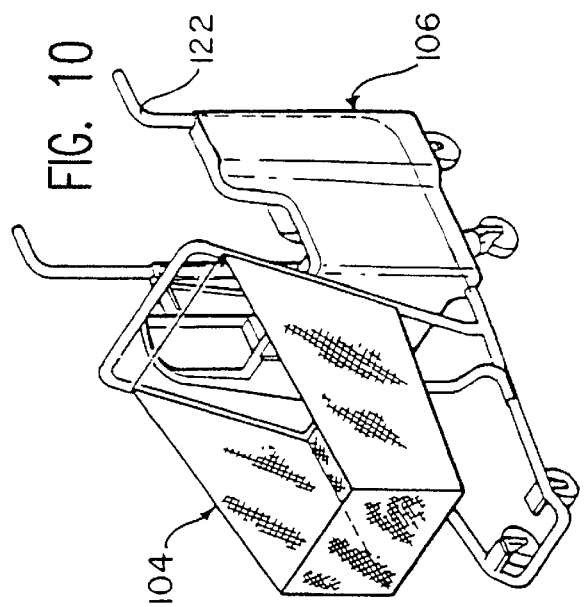
Figure 8:
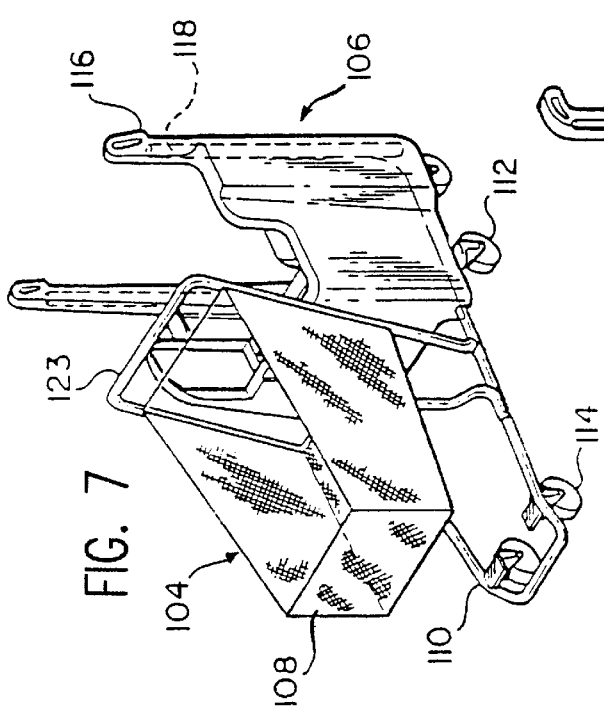
Figure 10:
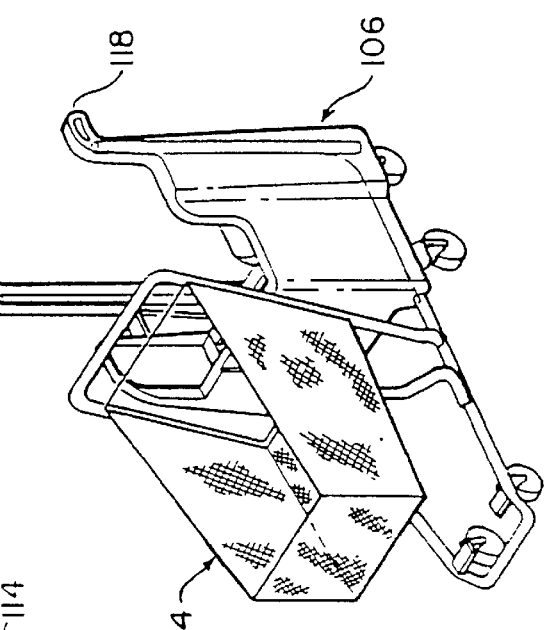
Figure 11:
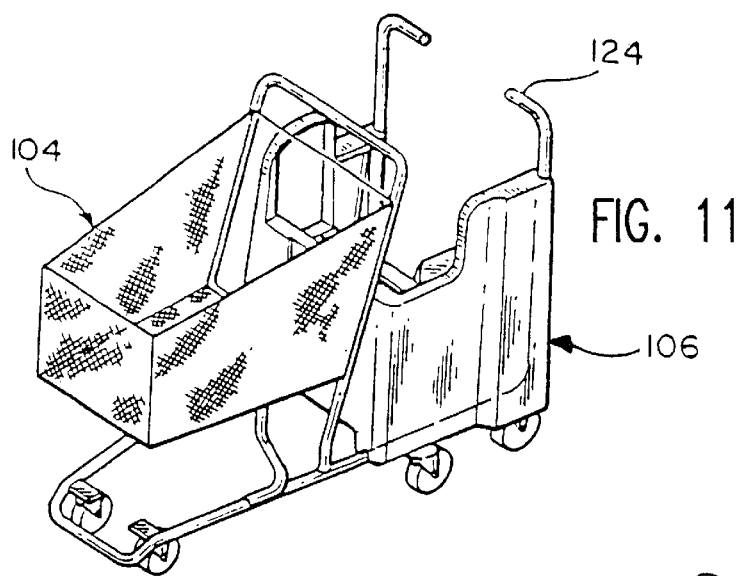
Figure 12:
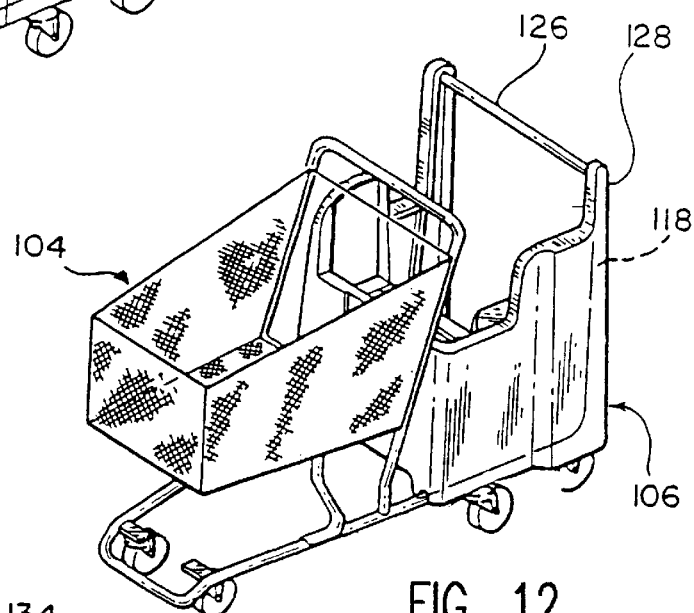

In FIG. 8, the handles 118 are shown as curving rearwardly to provide a horizontal gripping area for maneuvering the basket and module assembly and to reduce the vertical height of the assembly. In FIG. 9, the handle elements are shown as vertical posts 120 which may incorporate reinforcing elements (which may be incorporated into all of the embodiments) as described herein. In FIG. 10, the handles 122 may be arched or bent over to provide gripping areas for the assembly and to reduce the vertical height of the handles of the module. In FIG. 11, the handle elements 124 may be curved inwardly towards the longitudinal centerline of the cart module 104 while leaving a gap between the ends of the handles to permit seating of a child or children and nesting of a similar cart and seating module assembly. In FIG. 12, the handle 126 may comprise a single bar spanning vertical upright sections 128 located at the rear end of the seating module 6, the upright sections 128 surrounding vertical reinforcing rods or posts.

Figure 13:
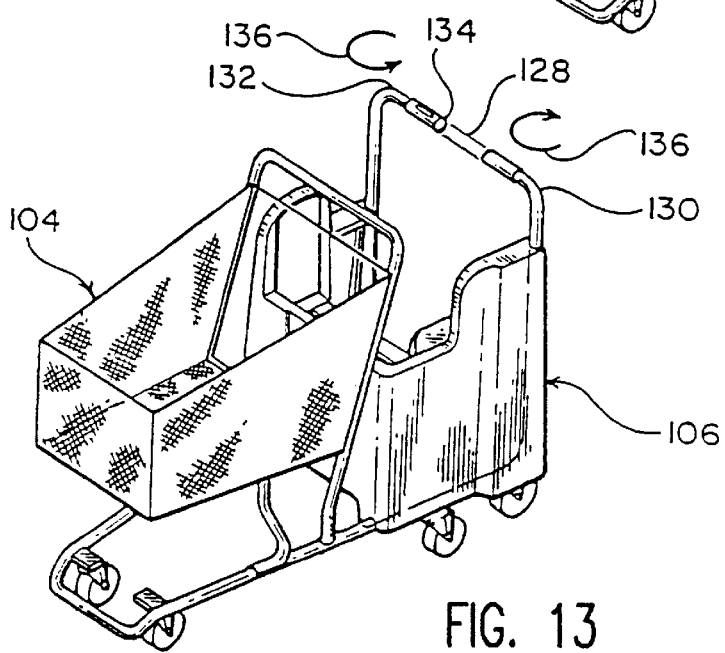

In FIG. 13, the handle arrangement for the seating module 106 includes a pair of pivoting handle portions 130, 132 and a slidable connector element 128 that spans the ends of the rotatable portions 130, 132. The slidable connector element 128 is secured by an appropriate latch 134 when extended so as to span the rotatable portions 130, 132. In operation, the latch 134 is released and the slidable connector element 128 telescopes or moves laterally relative to one of the rotatable portions 130, 132 so that the rotatable portions 130, 132 can be pivoted in the direction of arrows 136. This operation opens the entire central area of the seating module 106.

While the invention has been described in terms of several embodiments, those skilled in the art will recognize that the invention can be practiced with modification within the spirit and scope of the appended claims.

Having thus described our invention, what we claim as new and desire to secure by Letters Patent is as follows:

1. A multiple child seat nestable shopping cart, comprising:
    a wheeled chassis having a longitudinally extending central area;
    a shopping cart basket mounted on the wheeled chassis, the shopping cart basket including a front nesting portion;
    a seating module connecting to the wheeled chassis, the seating module including at least one seat facing inwardly towards the longitudinally extending central area which extends along a centerline in a lengthwise direction of the wheeled chassis and positioned behind a rear portion of the shopping cart basket, the at least one seat being positioned, dimensioned and configured so as to receive a front nesting portion of another cart basket over the at least one seat when unoccupied; and
    at least one front wheel and at least one rear wheel rollingly supporting the seating module.

2. The shopping cart of claim 1, wherein the at least one front wheel is two front wheels.

3. The shopping cart of claim 2, wherein the two front wheels are caster wheels.

4. The shopping cart of claim 1, wherein the at least one rear wheel is two rear wheels.

5. A multiple child seat nestable shopping cart, comprising:
    a wheeled chassis having a longitudinally extending central area;
    a shopping cart basket mounted on the wheeled chassis, the shopping cart basket including a front nesting portion;
    a seating module connecting to the wheeled chassis, the seating module including at least one seat facing inwardly and positioned behind a rear portion of the shopping cart basket, the at least one seat being positioned, dimensioned and configured so as to receive a front nesting portion of another cart basket over the at least one seat when unoccupied; and
    at least one front wheel and at least one rear wheel rollingly supporting the seating module,
    wherein the at least one seat is at least two seats which face inwardly towards each other and towards the longitudinally extending central area which extends along a centerline in a lengthwise direction of the wheeled chassis.

6. The shopping cart of claim 5, further comprising at least two upright facing backrests for the at least two seats, respectively, the at least two upright facing backrests are positioned to receive the front nesting portion of the another cart basket therebetween when the at least two seats are unoccupied.

7. The shopping cart of claim 5, further comprising a floor between the at least two seats.

8. The shopping cart of claim 7, wherein the at least two seats are spaced apart from each other along a length of the seating module.

9. A nestable shopping cart and child seat, comprising:
    a basket module including a forwardly projecting basket having a front nestable portion;
    a seat module having a front set of wheels and a rear set of wheels and a longitudinal central area, the seat module being positioned at a rear of the basket module and including at least a first child seat facing a second child seat both facing towards the longitudinal central area; and
    a rear area in the seating module for receiving at least a front nestable portion of a basket of another shopping cart over the first child seat and the second child seat such that another cart can be nested within the seat module.

10. The nestable shopping cart of claim 9, wherein the first and second child seats include respective backrests arranged along respective back edges of the first and second child seats.

11. The nestable shopping cart of claim 10, wherein the basket module includes a basket module chassis and the seat module includes a separate seat module chassis connected together by a connector assembly removably connecting the basket module chassis with the seat module chassis.

12. The nestable shopping cart of claim 11, wherein the connector assembly includes a frame component of the basket module chassis fitting mating with a frame component of the seat module chassis and placing a bolt through aligning apertures of the frame component of the basket module chassis and the frame component of the seat module chassis.

13. A multiple child seat nestable shopping cart, comprising:
    a wheeled shopping cart having an overhanging basket;
    a wheeled seating module have at least one front wheel and at least one rear wheel, the wheeled seating module being fastened to the cart behind the basket;
    a first inwardly facing seat and a second inwardly facing seat spaced apart from the first inwardly facing seat both positioned within the wheeled seating module such that the first and second inwardly facing seats face towards one another on opposite sides of the seating module; and
    a floor extending between the first and second inwardly facing seats, wherein the first and second inwardly facing seats are dimensioned and configured so as to permit a forward overhanging portion of a basket of another shopping cart to pass over the first and second inwardly facing seats and into the seating module for nesting.

14. The shopping cart of claim 13, further comprising backrests for each of the first and second inwardly facing seats, the backrests being positioned to permit the forward overhanging portion of the basket of the another shopping cart to pass therebetween for nesting.

15. The shopping cart of claim 14, wherein the first and second inwardly facing seats and the backrests are a single molded component.

16. The shopping cart of claim 14, wherein the first and second inwardly facing seats, the floor and the backrests are a single molded component.

17. The shopping cart of claim 13, further comprising a cart maneuvering handle arrangement located towards a rear of the basket selected from the group consisting of a handle spanning the rear cart area, individual unconnected gripping devices and pivotally mounted handle portions connectable by a central portion spanning the pivotally mounted portions.

18. The shopping cart of claim 17, wherein the handle device is arranged to permit access to the first and second inwardly facing seats and to avoid interference with nesting with the front nesting portion of an overhanging basket of the another shopping cart.

19. The shopping cart of claim 13, wherein the first and second inwardly facing seats have seat edges which extend beyond one another.

20. The shopping cart of claim 13, wherein the first and second inwardly facing seats are offset from one another.

21. A multiple child seat nestable shopping cart, comprising:

a wheeled chassis having a longitudinally extending central area;

a shopping cart basket mounted on the wheeled chassis, the shopping cart basket including a front nesting portion;

a seating module connecting to the wheeled chassis, the seating module including at least one stationary backrest and at least one seat associated with the at least one stationary backrest, the at least one seat facing inwardly and positioned behind a rear portion of the shopping cart basket, the at least one stationary backrest and seat being positioned, dimensioned and configured so as to receive a front nesting portion of another cart basket over the at least one seat when unoccupied; and at least one front wheel and at least one rear wheel rollingly supporting the seating module.

* * * * *